(No Model.) 2 Sheets—Sheet 1.
T. J. HUBBELL.
COMBINED SULKY HARROW AND CULTIVATOR.
No. 527,174. Patented Oct. 9, 1894.
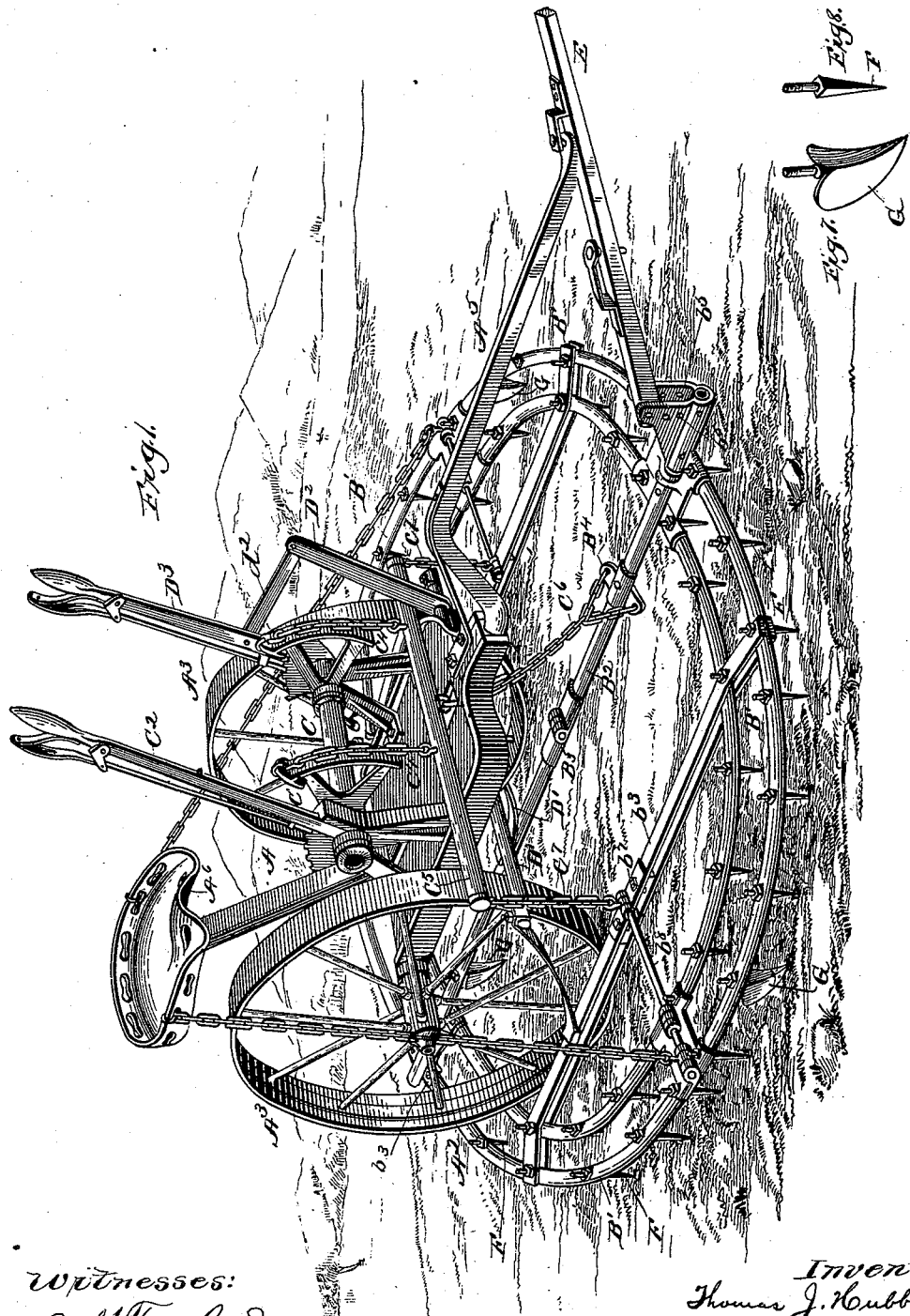
Witnesses:
J. M. Fowler Jr.
Jas. T. O. Neale.
Inventor:
Thomas J. Hubbell
By A. M. Evans & Co.
Attorneys.

(No Model.) 2 Sheets—Sheet 2.
T. J. HUBBELL.
COMBINED SULKY HARROW AND CULTIVATOR.
No. 527,174. Patented Oct. 9, 1894.
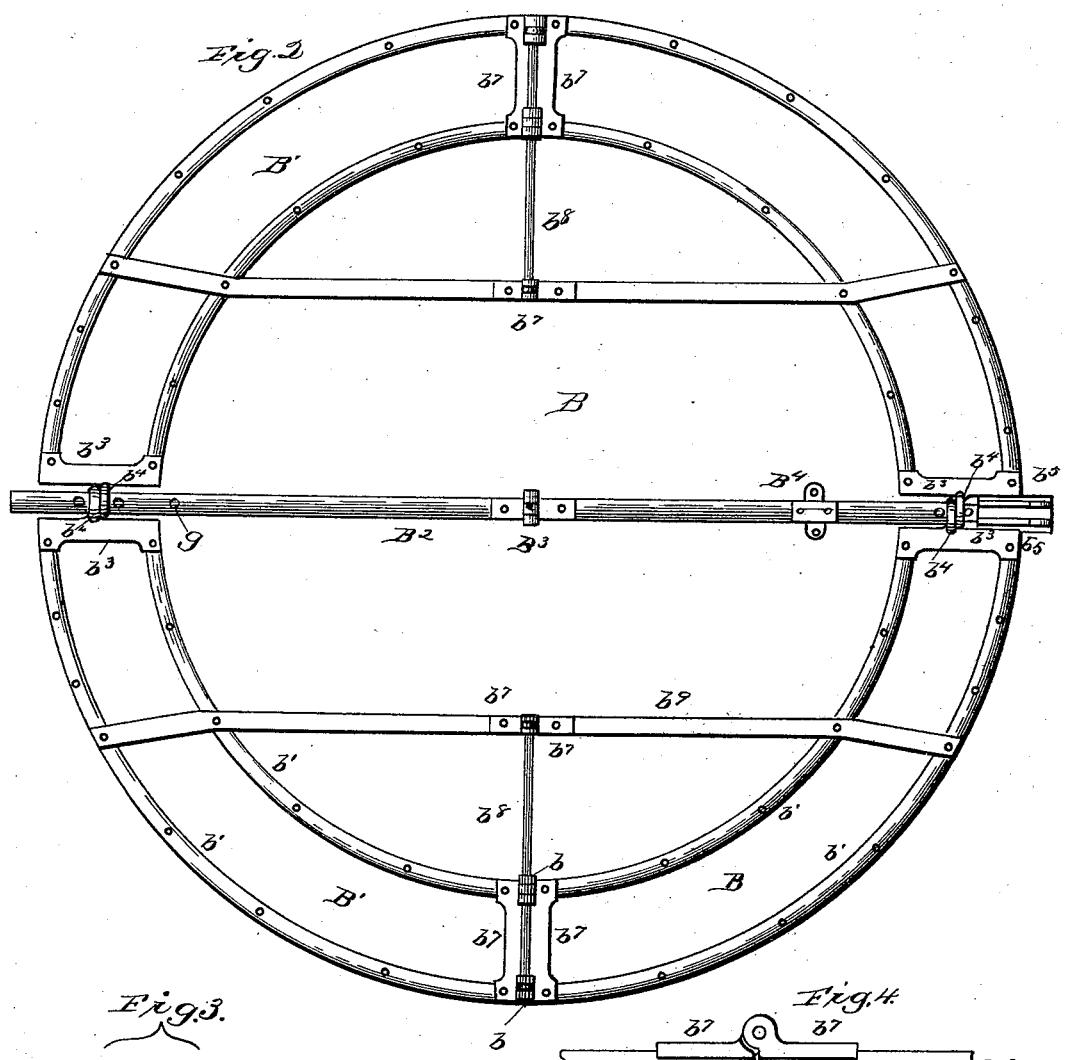
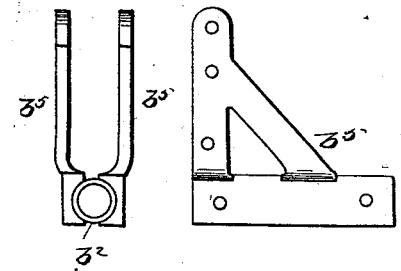
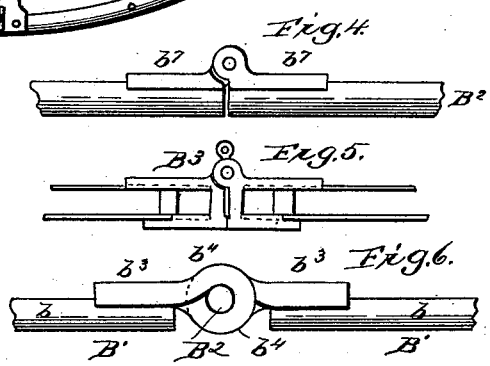
Witnesses:
J. M. Fowler
J. T. O'Neale.
Inventor:
Thomas J. Hubbell
By A. H. Evans
Attorneys:

UNITED STATES PATENT OFFICE.

THOMAS JEFFERSON HUBBELL, OF SANTA CRUZ, CALIFORNIA.

COMBINED SULKY HARROW AND CULTIVATOR.

SPECIFICATION forming part of Letters Patent No. 527,174, dated October 9, 1894.

Application filed June 26, 1894. Serial No. 515,764. (No model.)

*To all whom it may concern:*

Be it known that I, THOMAS JEFFERSON HUBBELL, a citizen of the United States, residing at Santa Cruz, in the county of Santa Cruz and State of California, have invented certain new and useful Improvements in a Combined Sulky Harrow and Cultivator, of which the following specification contains a full, clear, and exact description, reference being had to the accompanying drawings, forming a part of this specification, in which—

Figure 1, is a perspective of the machine. Fig. 2, is a plan view of the circular cultivator detached from the sulky, and Figs. 3, 4, 5, 6, 7 and 8, are details to be hereinafter referred to.

The object of the invention is to improve the sulky harrow for which I received Letters Patent No. 512,110, dated January 2, 1894.

The invention will first be described and then specifically pointed out in the claims.

A, represents the sulky comprising the platform $A'$, axle $A^2$, wheels $A^3$, forwardly projecting reach $A^5$, and seat $A^6$. Upon the platform are mounted two standards $A^4$ provided with bearings in their upper ends in which is mounted the rock-shaft C which carries two grooved, segmental arms $C'$ and an operating lever $C^2$ provided with a hand operated locking latch engaging a segmental rack on the upper end of one of the standards $A^4$. Forwardly extending chains $C^4$ are secured to the rear ends of these segmental arms $C'$ and extend to their opposite ends where they support a transverse lifting bar $C^5$.

All of the above described mechanism is constructed and arranged as in my said patent above referred to, and need not be further described.

$B^2$ is a longitudinal central round bar formed of two lengths of round pipe hinged together by a hinge $B^3$ after the manner of a rule joint; the two members of the hinge being secured to the upper sides of the two sections to permit them to swing upwardly therefrom but not downwardly, and the forward member of the bar $B^2$ is provided with a clip $B^4$ to which is connected the lower end of the chain $C^6$ as clearly shown in Fig. 1. The front end of the bar $B^2$ is provided with a bracket formed of two vertical parallel plates $B^5$, see Figs. 1 and 3; having their lower portions concaved to fit around the bar and bolted thereto while their upwardly extending portions are provided with vertically arranged series of apertures to receive the pivot bolt of the tongue E to which tongue the forward end of the reach is also pivotally connected in front of the plates $B^5$ as in said patent.

B is the circular harrow frame formed in four sections $B'$ each in the form of a quarter circle. These sections $B'$ are hinged at their opposite ends to the said round bar $B^2$ to swing vertically toward and from the sides of the machine, while the inner abutting ends of each two sections are hinged together in transverse horizontal alignment with the hinge $B^3$ so that the circular frame is free to swing up at right angles to its movement on the central rod $B^2$.

The sections $B'$ at opposite sides of the machine are formed of inner and outer concentric curved tubular bars $b$ connected by longitudinal braces $b^2$ bolted or riveted to their upper and lower faces. These bars $b^2$ are in sections hinged together at their inner edges. The opposite ends of the sections $B'$ are provided with hinge leaves $b^3$ which connect their bars $b$ $b$ firmly together and each of these leaves has a round eye $b^4$ through which freely passes the round rod $B^2$ suspended from the sulky and which rod is provided with apertures $b^5$ through which are passed removable pins $b^6$ which prevent the eyes from longitudinal movement. Fig. 6 shows this mechanism in detail. The inner or abutting ends of the two sections $B'$ of each pair are provided with hinge leaves $b^7$ both on the braces $b^3$ and the curved bars $b$ and these leaves are connected by a common pintle $b^8$ which pintle is in horizontal alignment with the pintle of the hinge $B^3$. These hinges $b^7$ are made like those of a rule joint and permit the harrow sections to swing upwardly therefrom, but prevent them from swinging downwardly below the horizontal plane. The outer hinges are shown in detail in Fig. 4, while the brace hinges are shown in Fig. 5. These latter hinges have upper and lower flanges between which the ends of the two members are received and bolted or riveted. The brace hinges are each provided with an eye $b^9$ to which the suspension chains $C^7$ are connected as shown in Fig. 1. By thus suspending and hinging the harrow it may be raised with its four members lying in a horizontal plane, and yet in passing over rough and uneven ground independent movement is afforded the said sections.

D, represents a transverse rock-shaft journaled in bearings on the under side of the sulky platform and provided at its ends with spring arms D' which extend downwardly and rearwardly and bear upon the braces $b^9$ of the rear harrow sections. The lower ends of these spring arms D' are provided with side flanges $d'$ which embrace the sides of the braces and prevent lateral movement or disengagement of the arms. A crank arm $D^2$ projects up from one end of the crank shaft and is connected by a link $d^2$ with a lever $D^3$ mounted loosely on the end of the rock-shaft C. This lever $D^3$ has a locking mechanism like that of the lever $C^2$. By pulling the lever $D^3$ to the rear the spring arms D' will be caused to bear upon the harrow sections and hold them down to their work. This will be of special advantage where stiff and light soils are encountered in the same field, for in approaching a stiff or hard piece of soil the operator needs only to pull the lever $D^3$ toward him in order to hold the harrow down to its work. As the weighting or tension mechanism is wholly independent of the mechanism for raising and lowering the harrow frame the latter may be raised and lowered without affecting the tension of the spring arms D' which arms may be swung up out of the way of the frame sections as they only bear loosely thereon at their lower flanged ends. The chains $C^8$ are connected with the driver's seat and with eyes on the outer hinges $b^7$ so that either side of the harrow may be raised at any time; the two sections swinging up together owing to the rule joint hinge and the attachment of the chain thereto.

The bars $b'$ are provided with apertures for the shanks of the harrow or cultivator teeth F and in order that at the last harrowing the ground may be laid out for corn, I provide three small double moldboard plows G which project below the points of the teeth F. One of these plows G is secured to the rear end of the central bar by passing its shank through an aperture $g$ therein just in advance of the rear hinges, and the other two plows are similarly secured to the harrow sections B' a suitable distance apart from the middle plow. Thus as the machine is driven across the field for the last time, the three plows will form the rows for corn or other crop which requires such marking or laying out.

Any of the various kinds of harrow or cultivator teeth may be substituted for or interchanged with those here shown, and if desired, cutters like the cutters F (except it should be curved) in my said patent may be employed, and the chains E' there shown may also be used if necessary or desirable.

The details of the weighting or tension mechanism D, D' $D^2$ $D^3$ may of course be greatly varied without departing from the spirit of my invention.

Having thus described my invention, what I claim as new, and desire to secure by Letters Patent of the United States, is—

1. The combination with a sulky, of an open harrow frame formed in sections adapted to swing vertically and suspended in a horizontal plane from and inclosing said sulky, and a tension mechanism mounted on the sulky separate and independent of the suspension mechanism and loosely engaging sections of the harrow frame at opposite sides of the sulky to enable it to be moved out of engagement with said sections when they are to be raised or have free movement, substantially as set forth.

2. The combination with the sulky and the harrow or cultivator suspended therefrom, of a rock-shaft on the sulky provided with depending spring arms engaging the said frame, with their lower free ends; said lower ends being disconnected from the harrow and adapted to be swung upwardly therefrom without affecting the suspension devices, substantially as herein described.

3. The combination with the sulky and the sectional harrow or cultivator frame suspended therefrom, of a rock-shaft on the sulky and provided with spring arms engaging the said sections, with their lower free ends; said lower ends being disconnected from the harrow and adapted to be swung upwardly therefrom without affecting the suspension devices, substantially as herein described.

4. The combination with the sulky and the longitudinal central bar suspended therefrom and provided at opposite sides with vertically swinging harrow or cultivator sections, of a transverse rock-shaft on the sulky and having downwardly and rearwardly extending arms bearing on said sections, with their lower free ends; said lower ends being disconnected from the harrow and adapted to be swung upwardly therefrom without affecting the suspension devices, substantially as herein described.

5. The combination with a sulky having a forwardly extending reach, a longitudinal central bar suspended beneath the sulky, and a tongue to which said reach and bar are connected, of frame sections hinged to said bar, and a tension or weighing mechanism carried by the sulky separate and independent of the suspension mechanism and loosely engaging the said frame sections to hold them down said tension or weighting mechanism being movable upwardly out of engagement with the frame sections, substantially as herein described.

6. The combination with a sulky having a forwardly extending reach, a longitudinal central bar suspended beneath the sulky, a tongue to which the reach and bar are connected, and the frame sections hinged to said bar, of a rock-shaft on the sulky provided with spring arms bearing loosely at their lower free ends on the said sections and provided with an operating mechanism for throwing them down into engagement with and raising them away from said frame sections, substantially as herein described.

7. The combination with the sulky, having transverse rock-shafts thereon provided with operating levers, and chains depending from one of said shafts, of a sectional harrow or cultivator frame suspended from said chains, and spring arms extending down from the other rock-shaft and bearing loosely on said frame sections whereby said arms may be swung up away from the frame sections, substantially as herein described.

8. A weighting or tension mechanism for harrows or cultivators comprising a rock-shaft, spring arms projecting therefrom and each having parallel flanges on its lower end, and mechanism for rocking the shaft, substantially as herein described.

9. A harrow frame divided longitudinally and transversely into four hinged sections, and a central bar forming the longitudinal axis of said sections, and formed of two sections hinged in alignment with the transverse hinging points of said frame sections, substantially as herein described.

10. A circular harrow frame comprising a sectional hinged central bar, side frame sections hinging thereon at their opposite ends and each formed of two transversely divided sections having braces also hinged, the transverse hinges of the sections aligning with the hinge of the central bar, substantially as herein described.

11. A harrow frame comprising a central round bar, and harrow frame sections, each provided with round eyes at their opposite ends through which the bar freely passes, and stops to prevent the eyes from longitudinal movement along the bar, substantially as herein described.

12. The combination with the sulky having a round bar longitudinally and centrally therebelow, frame sections having round eyes to slip on and off of the round bar and mechanism on the sulky connected with said bar and sections for raising and lowering them substantially as herein described.

13. The combination with the sulky having a forwardly extending reach and a tongue connected therewith, of a round central longitudinal bar having an apertured bracket at its forward end to which the rear end of the tongue is pivoted, hinged frame sections having eyes passed upon the bar, stops on the bar to prevent rearward movement of the eyes, and mechanism on the said sulky connected with the frame sections for simultaneously raising and lowering them, substantially as herein described.

14. The combination with the sulky having a forwardly extending reach, and a tongue pivoted thereto near its rear end, of a central longitudinal round bar pivoted at its forward end to the rear end of the tongue, semi-circular frame sections having eyes passed upon the bar, stop pins on the bar to prevent rearward movement of the eyes, and mechanism on the sulky for raising and lowering the bar and sections hinged thereon, substantially as herein described.

15. The combination with the sulky having a reach and a tongue pivoted thereto near its rear end, of a central longitudinal bar in two hinged sections and pivoted at its front end to the rear end of its tongue, transversely divided semi-circular frame sections having eyes at their opposite ends through which the bar freely passes, stops to prevent longitudinal movement of said eyes; the members of said frame sections being hinged at their abutting ends in alignment with the hinge of the said bar and mechanism on the said sulky for raising and lowering the said bar and frame sections, substantially as herein described.

16. A sulky harrow comprising the sulky proper having two transverse rock-shafts, the operating levers of which are at opposite sides of the driver's seat, a forwardly extending reach to which the tongue is pivoted near its rear end, a longitudinally and transversely jointed circular harrow having a jointed bar pivoted at its front end to the rear end of the tongue, chains extending down from one rock shaft to the harrow sections and bar, and spring arms extending from the other rock-shaft and bearing on the harrow frame, substantially as herein described.

THOMAS JEFFERSON HUBBELL.

Witnesses:
L. W. HALSEY,
CHARLES HELLBERG.